United States Patent [19]
Brennan et al.

[11] Patent Number: 5,347,101
[45] Date of Patent: Sep. 13, 1994

[54] AUTOMATIC TRACKING SYSTEM FOR PIPELINE WELDING

[75] Inventors: Michael J. Brennan, Columbus, Ohio; Clyde D. Noel, Houma, La.

[73] Assignee: McDermott International, Inc., New Orleans, La.

[21] Appl. No.: 193,494

[22] Filed: Feb. 7, 1994

[51] Int. Cl.⁵ ............................................. B23K 9/127
[52] U.S. Cl. .............................. 219/124.34; 219/60 R; 219/125.11
[58] Field of Search ............... 219/60 R, 61, 125.11, 219/124.34

[56] References Cited

U.S. PATENT DOCUMENTS

| | | | |
|---|---|---|---|
| 4,328,416 | 5/1982 | Dudley et al. | 219/124.34 |
| 4,373,125 | 2/1983 | Kazlauskas | 219/60 A |
| 4,596,919 | 6/1986 | Kremers et al. | 219/124.34 |

FOREIGN PATENT DOCUMENTS 57-5623  2/1982  Japan ..................... 219/61

Primary Examiner—Clifford C. Shaw
Attorney, Agent, or Firm—Robert J. Edwards; D. Neil LaHaye

[57] ABSTRACT

A system for automatically tracking a surface for performing a welding operation comprises a frame and pair of ring gears movably mounted to the frame. The ring gears are spaced apart from each other. Three weld heads are movably mounted to each ring gear. Each weld head has a welding torch for providing a weld and a laser scanning device for scanning a surface and for measuring distances over the surface. A control system communicates with the laser scanner for receiving the measured distances and for controlling the movement of the ring gears and the weld heads.

8 Claims, 3 Drawing Sheets

AUTOMATIC TRACKING SYSTEM FOR PIPELINE WELDING

FIELD AND BACKGROUND OF THE INVENTION

The present invention relates, in general, to the arc welding of pipe seams and, in particular, to a new and useful system and method for welding a seam using automatic tracking.

In the metal working field, gas metal arc welding systems are used for welding large diameter pipelines offshore. The equipment is installed on pipe lay barges and utilizes multiple weld heads, i.e. torches, in order to perform the welding of pipe seams. Additionally, as the torches move around the weld groove, each torch oscillates to cover the width of the groove and the seam tracking is controlled during this oscillation as taught by U.S. Pat. No. 4,857,701. At present, the seam tracking is performed by the manual control of each weld head by an operator as disclosed by U.S. Pat. Nos. 3,764,056 and 3,858,026. Automatic seam tracking, such as the tracking disclosed by U.S. Pat. No. 4,525,616, has been developed in order to remove human error from the tracking of weld heads.

Moreover, automatic welding systems have been used for offshore pipelines; and other types of automatic tracking systems are already known.

"Through arc" tracking is one method of automatic tracking that is used in automatic welding. This method senses the change in arc voltage as the arc approaches a sidewall in the weld groove. This information is then electronically processed with respect to the location of the groove. The torch is then guided in the center of the weld groove. Although the method provides for sensing the exact location of the side wall, the system utilized is very complex and requires the addition of sophisticated electronics.

A second method uses a mechanical sensor for mechanical seam trackers which are used in automatic welding. In each case, a mechanical sensor is placed somewhere in the groove, usually ahead of the moving torch, and acts as a guide. The torch, via a mechanical assembly, then follows the sensor. Although the sensor usually provides a simple approach to automatic tracking and does not require as much electronics technology as other known methods, errors are easily introduced due to irregularities in the weld groove resulting from the longitudinal weld seam, weld spatter, grinding and the like.

Another method of automatically tracking a weld seam is through the use of optics. Optical seam trackers typically focus light on the edge of the weld groove or some other known reference and, through opto-electronics, use the location to guide the movement of the weld head down the center of the groove. Although optical technology can be very precise, the optical tracking system is a very complex system requiring the addition of sophisticated electronics and optics.

SUMMARY OF THE INVENTION

The present invention pertains to a system for automatically tracking a surface for performing a welding operation. The system comprises a frame and a pair of ring gears movably mounted to the frame. The ring gears are spaced apart from each other. Three weld heads are movably mounted to each ring gear. The weld heads are equipped with welding means for providing a weld and laser scanning means for scanning a surface and for measuring distances over the surface. Control means communicate with the laser scanning means for receiving the distances measured by the scanning means. The control means also regulate the movement of the ring gears and the movement of the weld heads accordingly.

The present invention also pertains to a method for automatically tracking a surface so as to enable a welding unit to perform a welding operation on the surface. The method comprises scanning the surface with laser measuring means and determining a mapping of the surface by the scanner. A map of the surface and the location of the weld groove is determined through scanning and stored in the control system's memory. A tracking for the welding unit is then set according to the mapping of the surface and the location of the weld groove. After setting the tracking, the welding operation is performed by the welding unit according to the set tracking.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
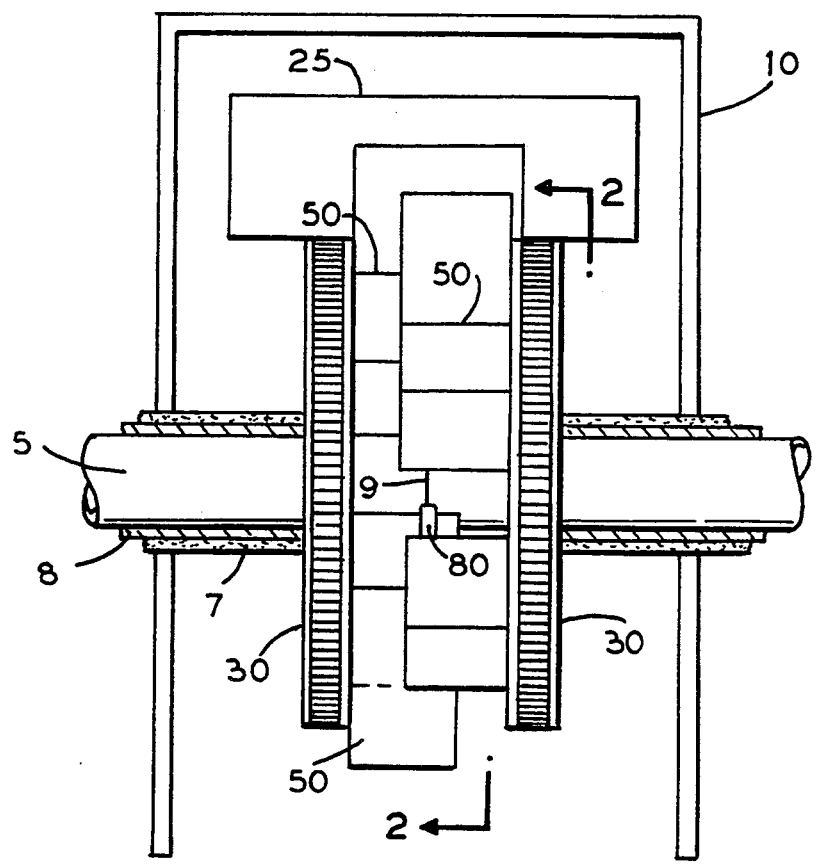
FIG. 1 is a schematic view of a tracking system according to the present invention.

The present invention pertains to arc welding operations, and, in particular, to the welding operation performed on offshore pipelines. As shown in FIG. 1, offshore pipelines 5 generally consist of steel pipe having a type of corrosion-resistant coating 8 applied on the outside surface of the pipe, except at the ends of the pipe where welding operations are to be performed. An amount of concrete 7, which is variable, is coated on top of the coating 8. The concrete coating 7 is typically between 2 and 6 inches thick. The concrete 7 adds weight to the pipe 5 to ensure negative buoyancy. It is well-known that the concrete 7 on top of the coating 8 is not uniform.

When performing a welding operation by a welding unit, a welding unit frame 10 rests on the concrete layer 7. Because of the non-uniformity of the concrete layer 7, the frame 10 is cocked and skewed to some degree with respect to the plane of a weld 9. Thus, the present invention provides a form of seam tracking for accommodating this problem.

As illustrated in FIG. 1, the frame 10 has two ring gears 30 which are spaced apart from each other and are parallel with each other. The ring gears 30 are movably mounted to the frame 10 and their movement is controlled by a control system 25 comprising a brushless DC motor and a servo system.

Figure 2:
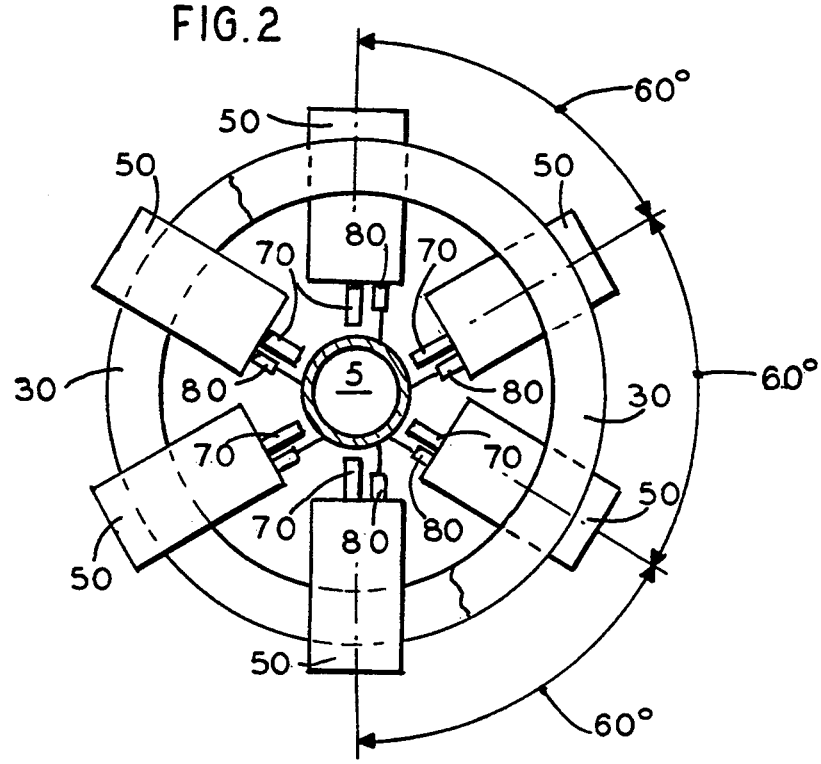
FIG. 2 is a sectional view taken along line 2—2 of FIG. 1.
Figure 3:
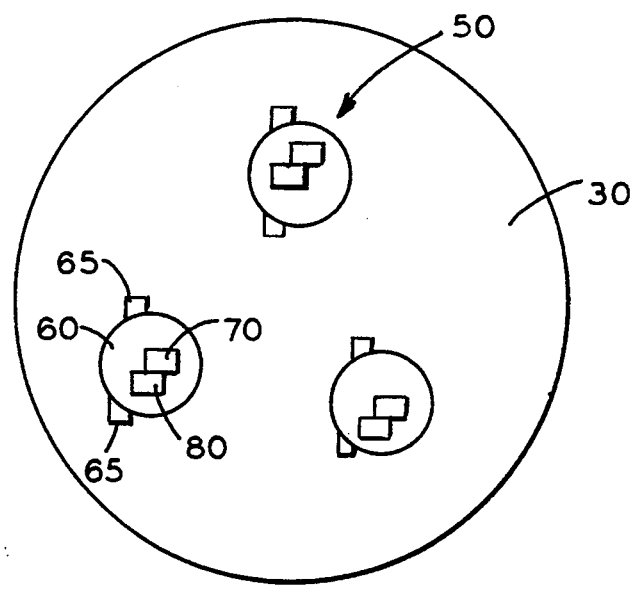
FIG. 3 is a schematic end view of a ring gear of the system of FIG. 2.

As shown in FIG. 2 and 3, each ring gear 30 has three weld heads 50 movably mounted to the ring gears 30. Thus, there are six weld heads 50 provided on the present invention, i.e. three weld heads 50 on each ring gear 30. Preferably, the weld heads 50 are mounted approximately 60° apart from each other. The weld heads 50 are mounted to the ring gears 30 by an extended Y plane table, which is part of the mechanical table 60 described below and is responsible for moving the weld heads 50 toward and away from the surface of the pipe 5 (FIG. 2). The Y plane table is also known as an "out-of-round" unit. Although the use of electrical means such as a mechanical table is preferred for moving the weld heads to the surface of the pipe, any suitable means such as a pneumatic cylinder may also be used.

Figure 5:
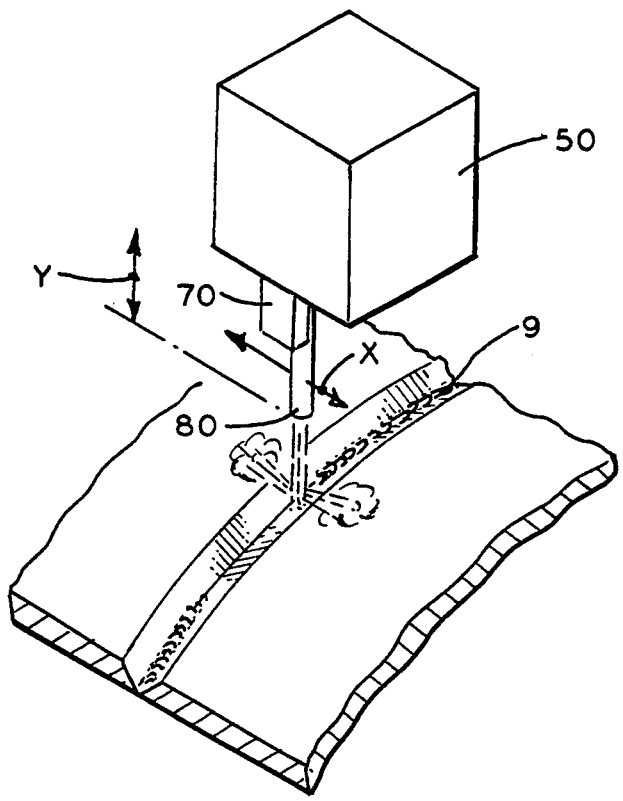
FIG. 5 is a schematic view illustrating the welding step.

The weld heads 50 also comprise a mechanical table 60, which is an X-Y table, and a welding torch 80 mounted on the output side of the table 60. The table 60 is movable in multiple directions such as an X plane, which is defined as the direction of torch oscillation horizontally across a weld groove 9 as shown in FIG. 5. The mechanical table 60 is also movable in a Y plane which is defined as the direction in which the weld head 50 and torch 80 vertically travel toward or away from the surface of the pipe 5 (FIG. 5). The X-Y table 60 has two controllers 65, which are brushless DC motors wherein each brushless motor controls the movement of the tables 60 in their respective planes. The motors are each equipped with a resolver in order to produce positions/velocity/commutation feedback information. The controllers 65 also comprise a servo system, such as a servo amplifier for sending this information to a main system computer. In this way, the relative location of each weld head 50 is available and known at all times.

The weld head 50 also comprises a laser measuring device 70 on each weld head 50. The laser device 70 is a class IIIB laser which uses a triangulation technique in order to precisely measure the distance to an object. When the weld head 50 is installed on the ring gear 30, a precise reference location is measured between the torch 80 and the laser 70 in a calibration procedure.

Figure 4:
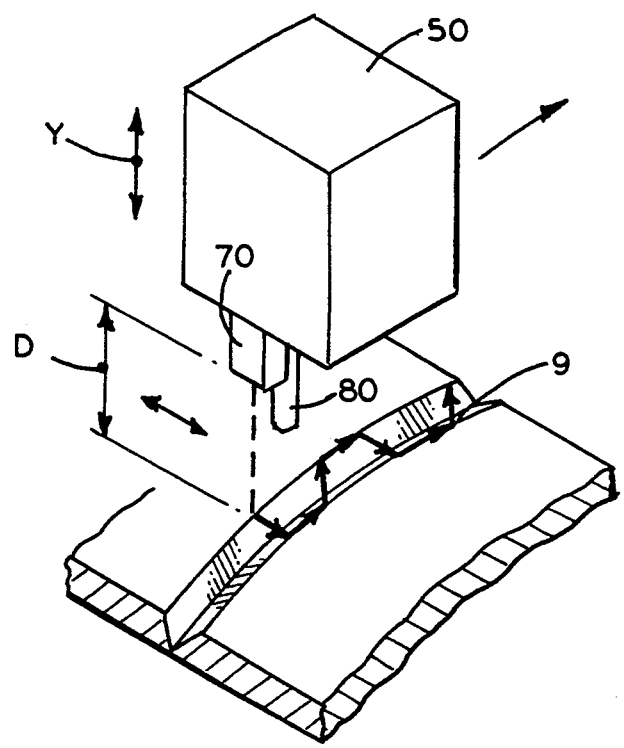
FIG. 4 is a schematic view illustrating the laser scanning and mapping step.
Figure 6:
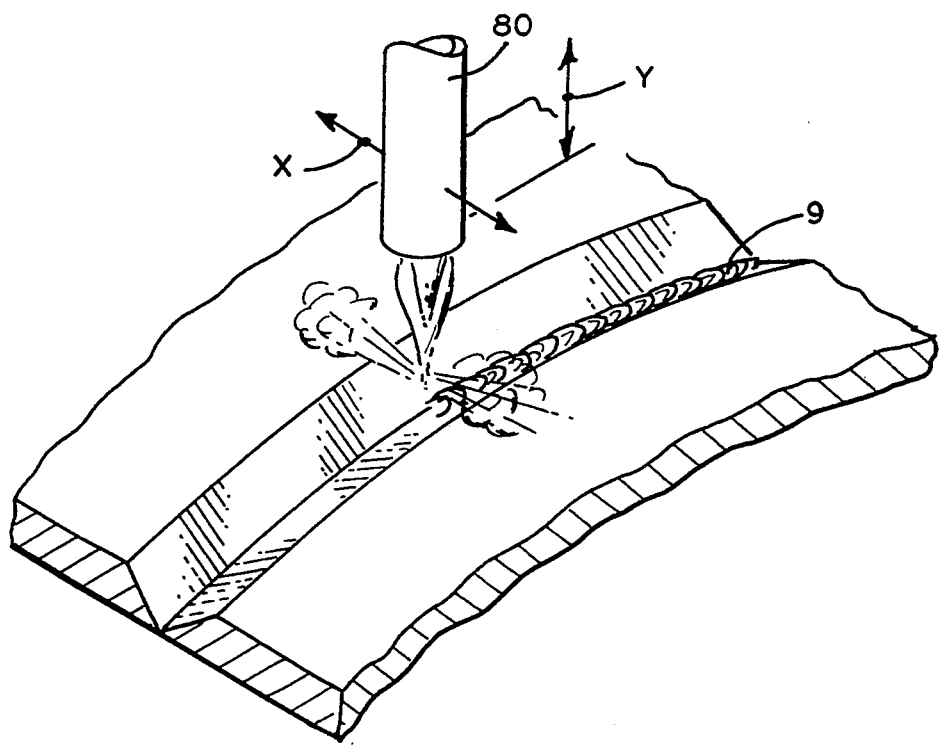
FIG. 6 is a detail view of the welding step.

The weld heads 50 are mounted on the ring gears 30 and move in a repeatable pattern around the surface of the pipe 5 (FIG. 2). The lasers 70 attached to the weld heads 50 scan the surface of the pipe 5 on each side of and across the weld groove 9 (FIG. 4). The present invention performs this scanning operation over the entire circumference of the pipe 5 as shown in FIG. 2. The distance measured and the location of the weld groove relative to the laser measuring device 70 are stored by the control system for the present invention. Based on the measured distances and location of the weld groove, a tracking is set for the welding unit. Any radial movement of the weld heads 50 on the ring gears 30 is then matched through the movement of the X-Y table 60 in order to maintain the torches 80 at the center of the weld groove 9 for providing an oscillation weld 20 as shown in FIG. 5 and 6.

Once the out-of-round unit has fully extended the weld heads and the operator is ready to weld, a safety warning light and alarm is activated and the laser measuring device 70 is also activated.

Upon activation, the lasers 70 begin to scan the pipe surface 5 (FIG. 4) across the weld groove 9 for providing a map of the pipe surface 5 and location of the weld groove 9 which is stored in the memory of the control system. This information is taken for the entire circumference of the pipe 5 in 60° segments. When the scan is completed, the lasers 70 are deactivated.

Once the mapping scan is complete, the system is ready to weld. Any movement of the weld heads 50 through the ring gears 30 is matched with a precise movement of the X-Y table 60 in order to maintain the torches 80 in the center of the weld groove 9 (FIG. 1). Thus, the present invention replaces the known manual control systems with a more precise automatic tracking method and system.

The main cause of weld repairs in gas metal arc welding is due to a lack of sidewall fusion. When manual tracking is used and the operator tracks off to one side or the other, proper fusion does not take place on both sides of the weld. The result is a defect which requires weld repair. The automatic tracking in gas metal arc welding according to the present invention replaces any degree of operator error by accurately locating the torch in the center of the weld groove at all times. This greatly reduces the chances of a lack of sidewall fusion due to tracking errors.

Additionally, manual tracking requires the operator to visually track each torch. Because of this, manual tracking usually limits the number of torches a single operator can handle to two. With automatic tracking of the present invention, the number of torches per operator can be increased. Therefore, the number of torches per operator is increased to three.

Moreover, manual tracking requires greater room for error in tracking without physically hitting a side wall. Since the automatic tracking of the present invention is more precise, the weld groove can be made more narrow, i.e. smaller side wall angle in the weld groove bevel. A more narrow groove, i.e. less volume, decreases the amount of weld metal required to fill the joint and consequently takes less time and less welding wire.

While a specific embodiment of the invention has been shown and described in detail to illustrate the application of the principles of the invention, it will be understood that the invention may be embodied otherwise without departing from such principles.

What is claimed is:

1. A system for automatically tracking a surface for performing a welding, the system comprising:
   a. a frame;
   b. a pair of ring gears movably mounted to the frame, the ring gears being spaced apart from each other;
   c. three weld heads movably mounted to each ring gear, the weld heads having welding means for providing a weld and laser scanning means for scanning a surface and for measuring distances over the surface; and
   d. control means communicating with the laser scanning means for receiving the measured distances and for controlling the movement of the ring gears and the movement of the weld heads.

2. The system according to claim 1, including means mounted between the ring gear and each weld head for moving the weld heads toward and away from the surface to be welded.

3. The system according to claim 2, wherein the welding means comprises a weld torch.

4. The system according to claim 2, wherein the means for moving the welding heads includes a movable table.

5. The system according to claim 4, wherein the control means comprises a ring gear motor operatively connected to the ring gears for moving the ring gears.

6. The system according to claim 5, wherein the control means further comprises at least one table motor operatively connected to the table for moving the welding head.

7. The system according to claim 6, wherein the table is moveable in a horizontal direction and a vertical direction.

8. The system according to claim 1, wherein each weld head is mounted circumferentially on the ring gear approximately 60° from another weld head.

* * * * *